United States Patent
Ito

(10) Patent No.: US 9,798,637 B2
(45) Date of Patent: Oct. 24, 2017

(54) INFORMATION PROCESSING APPARATUS AND CONTROL METHOD OF INFORMATION PROCESSING APPARATUS WITH ACCESS TO STORAGE DEVICE BASED ON COMMUNICATION WITH STORAGE DEVICE

(71) Applicant: CANON KABUSHIKI KAISHA, Tokyo (JP)

(72) Inventor: Nobuyasu Ito, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 64 days.

(21) Appl. No.: 14/694,805

(22) Filed: Apr. 23, 2015

(65) Prior Publication Data
US 2015/0309900 A1    Oct. 29, 2015

(30) Foreign Application Priority Data
Apr. 25, 2014  (JP) .................................. 2014-091811

(51) Int. Cl.
*G06F 11/00* (2006.01)
*G06F 11/20* (2006.01)

(52) U.S. Cl.
CPC ...... *G06F 11/2069* (2013.01); *G06F 11/2087* (2013.01)

(58) Field of Classification Search
USPC ....................................................... 714/6.21
See application file for complete search history.

(56) References Cited

U.S. PATENT DOCUMENTS

| | | | | | |
|---|---|---|---|---|---|
| 5,991,849 | A * | 11/1999 | Yamada | ................. | G11C 16/22 365/185.29 |
| 6,647,516 | B1 * | 11/2003 | Rust | ...................... | G06F 11/004 714/48 |
| 7,031,092 | B2 * | 4/2006 | Tanaka | ................... | G11B 19/04 360/75 |
| 7,143,315 | B2 * | 11/2006 | Rust | ...................... | G06F 11/004 714/4.2 |
| 7,451,341 | B2 * | 11/2008 | Okaki | ................... | G06F 11/201 714/4.1 |
| 7,489,923 | B2 * | 2/2009 | Varanda | ............... | G06F 9/4418 455/411 |
| 7,552,148 | B2 * | 6/2009 | Liu | ...................... | G06F 11/1435 |
| 9,176,813 | B2 * | 11/2015 | Guo | ................... | G06F 11/2094 |

(Continued)

FOREIGN PATENT DOCUMENTS

JP        2011-51258 A      3/2011

*Primary Examiner* — Amine Riad
(74) *Attorney, Agent, or Firm* — Canon USA, Inc. IP Division

(57) ABSTRACT

An information processing apparatus including a removable storage device for storing data includes a control unit that determines whether communication is possible with the storage device and, if communication with the storage device is determined not to be possible, prohibit data from being written to the storage device. When the information processing apparatus is started up, the control unit again determines whether communication is possible with the storage device to which the control unit prohibits data writing and permits data writing to the storage device if communication with the storage device is determined to be possible.

9 Claims, 10 Drawing Sheets

(56) References Cited

U.S. PATENT DOCUMENTS

| | | | |
|---|---|---|---|
| 2005/0154815 A1* | 7/2005 | Molander | G06F 3/0605 710/302 |
| 2006/0002093 A1* | 1/2006 | Carlson | G11B 33/128 361/726 |
| 2006/0090032 A1* | 4/2006 | Franklin | G06F 11/2094 711/114 |
| 2006/0107129 A1* | 5/2006 | Franklin | G06F 11/0727 714/710 |
| 2010/0042878 A1* | 2/2010 | Kanasugi | G11C 29/56 714/718 |
| 2010/0050016 A1* | 2/2010 | Franklin | G06F 11/0727 714/6.32 |
| 2011/0320868 A1* | 12/2011 | Sugita | G06F 11/1048 714/15 |

* cited by examiner

FIG.7A

STORAGE INFORMATION

|  | SERIAL NUMBER | FAILURE DETERMINATION RESULT |
|---|---|---|
| MASTER | 1111111111 | 0 |
| SLAVE | 2222222222 | 1 (FAILURE) |

FIG.7B

STATE INFORMATION

| STATE INFORMATION |
|---|
| DEGRADED |

INFORMATION PROCESSING APPARATUS AND CONTROL METHOD OF INFORMATION PROCESSING APPARATUS WITH ACCESS TO STORAGE DEVICE BASED ON COMMUNICATION WITH STORAGE DEVICE

BACKGROUND

Field

Aspects of the present invention generally relate to an information processing apparatus including a semiconductor storage device, a magnetic disk storage device, and the like, and a control method of the information processing apparatus.

Description of the Related Art

A mirroring technique which stores data pieces with the same contents in a plurality of storage devices is known as a failure countermeasure of the storage device, such as a solid state drive (SDD) and a hard disk drive (HDD).

A mirroring system detects a failure of a storage device to prompt a user to replace a faulty storage device when a failure occurs in the storage device. More specifically, if a control unit of the mirroring system is not communicable with the storage device for a certain period of time, the control unit determines that a failure occurs in the storage device (Japanese Patent Application Laid-Open No. 2011-51258, especially in paragraph 0012).

When it is determined that a failure occurs in the storage device, a serial number of the faulty storage device is stored in a memory. Then, if the faulty storage device is replaced with a new storage device of which serial number is different from the stored serial number, data stored in a normally operating storage device is rebuilt in the replaced new storage device.

With the recent raising of security awareness, a storage device is removed from an information processing apparatus and stored in a safe or the like at the end of daily operations to protect the storage device against theft.

In order to successfully remove the storage device, it is necessary to remove the storage device after shutdown processing (writing data to the storage device, stopping power supply to the storage device, and so on) is completed. It is because, if the storage device is removed before completion of the shutdown processing, a mirroring control unit in the mirroring system loses the ability to communicate with the storage device. When losing the ability to communicate with the storage device, the mirroring control unit determines that the storage device is faulty, as described above.

However, the storage device removed before the completion of the shutdown processing is not actually faulty. Therefore, a user would connect the storage device stored in the safe to the information processing apparatus to restart the operation.

The serial number of the storage device determined as faulty by the mirroring control unit is stored in the memory. Therefore, if the storage device (the storage device stored in the safe) is reconnected to the information processing apparatus, the information processing apparatus regards the reconnected storage device as a faulty device.

Especially, a recent information processing apparatus including a complicated system takes time to complete the shutdown processing, so that a situation may occur in which a user removes the storage device before the completion of the shutdown processing.

Accordingly, the storage device removed from the information processing apparatus before the completion of the shutdown processing is regarded as a faulty device and cannot be used even it is not actually faulty.

SUMMARY

Aspects of the present invention are generally directed to provision of an information processing apparatus that can regard a storage device removed from the information processing apparatus before completion of shutdown processing as a usable device if the storage device is not faulty.

According to an aspect of the present invention, an information processing apparatus including a removable storage device for storing data includes a control unit configured to determine whether to be communicable with the storage device and, if communication with the storage device is determined not to be possible, prohibit data from being written to the storage device, wherein, when the information processing apparatus is started up, the control unit again determines whether to be communicable with the storage device to which the control unit prohibits data writing and permits data writing to the storage device if communication with the storage device is determined to be possible.

Further features of the present disclosure will become apparent from the following description of exemplary embodiments with reference to the attached drawings.

BRIEF DESCRIPTION OF THE DRAWINGS

FIG. 4 is a flowchart illustrating processing executed when the MFP is powered on.

FIG. 5 is a flowchart illustrating processing executed when the MFP is powered on.

FIG. 6 is a flowchart illustrating processing executed when the MFP is powered on.

FIGS. 7A and 7B illustrate information stored in a static random access memory (SRAM).

DESCRIPTION OF THE EMBODIMENTS

Figure 1:
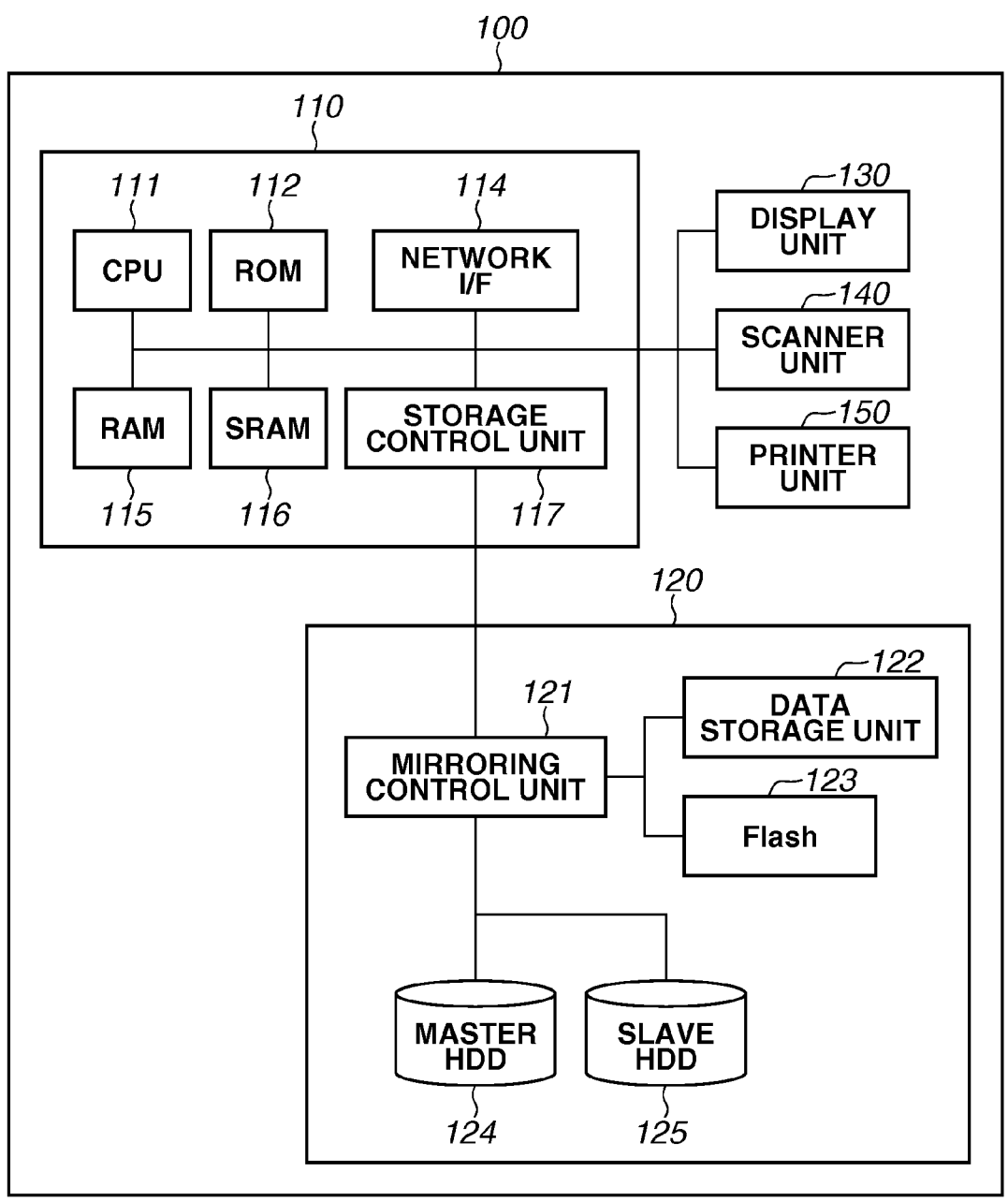
FIG. 1 is a block diagram of a configuration a multifunction peripheral (MFP).

FIG. 1 is a block diagram of a configuration an MFP.

An MFP 100 is an example of an information processing apparatus according to a first exemplary embodiment. The information processing apparatus according to the present embodiment may be a personal computer (PC) other than the MFP. As illustrated in FIG. 1, the MFP 100 includes a controller 110, a disk array apparatus 120, a display unit 130, a scanner unit 140, and a printer unit 150. The controller 110, the disk array apparatus 120, the display unit 130, the scanner unit 140, and the printer unit 150 are connected to a system bus 160. According to the present exemplary embodiment, the disk array apparatus 120 may be disposed in a housing for storing the controller 110 or may be disposed in a housing different from the aforementioned one.

The controller 110 controls the entire MFP 100. The controller 110 includes a central processing unit (CPU) 111, a read-only memory (ROM) 112, a network interface (I/F) 114, a random access memory (RAM) 115, an SRAM 116, and a storage control unit 117.

The CPU 111 controls the entire MFP 100. The RAM 115 stores programs executed by the CPU 111 and serves as a work memory for temporarily storing data pieces used for calculation by the CPU 111. The ROM 112 stores programs used for starting up the MFP 100. The SRAM 116 is a nonvolatile memory temporarily storing various setting values, image processing parameters, and various backup data pieces of the MFP 100. The network I/F 114 is an interface unit for receiving data transmitted from an external apparatus, which is not illustrated. The storage control unit 117 performs data communication with the disk array apparatus 120.

The disk array apparatus 120 includes a mirroring control unit 121, a data storage unit 122, a flash memory 123, a hard disk drive 124, and a hard disk drive 125. The disk array apparatus 120 according to the present embodiment includes two hard disk drives, namely the master hard disk drive 124 (hereinbelow, referred to as a master HDD 124) and the slave hard disk drive 125 (hereinbelow, referred to as a the slave HDD 125). The master HDD 124 and the slave HDD 125 are removably mounted on the disk array apparatus 120. According to the present exemplary embodiment, the disk array apparatus 120 is a mirroring system serving as a failure countermeasure of the hard disk drive, and data pieces stored in the master HDD 124 are also stored in the slave HDD 125. The disk array apparatus 120 according to the present exemplary embodiment is the mirroring system including a plurality of hard disk drives, however, the disk array apparatus 120 may be a single system including a single hard disk drive.

The mirroring control unit 121 writes data to the master HDD 124 and the slave HDD 125 and reads data from the master HDD 124 and the slave HDD 125 according to an instruction from the storage control unit 117. Further, the mirroring control unit 121 performs mirroring of data between the master HDD 124 and the slave HDD 125.

The data storage unit 122 stores status information of the disk array apparatus 120 and temporary data. The data storage unit 122 stores various data pieces used in mirroring. As the data storage unit 122, a flash ROM, a SRAM storing data by a button battery, and so on are used. Data pieces stored in the data storage unit 122 include a type and the number of HDDs.

The flash memory 123 stores programs executed by the mirroring control unit 121.

Each of the master HDD 124 and the slave HDD 125 includes a disk on which a magnetic substance is applied, a magnetic head writing and reading data to and from the disk, and a drive circuit controlling operations of the disk and the head. The master HDD 124 and the slave HDD 125 may be an SSD or a flash memory.

The display unit 130 includes a display which displays various information pieces to a user and a touch panel disposed on a surface of the display. A user can input various instructions (for example, a print instruction and a reading instruction) via the touch panel or buttons provided near the display unit 130.

The scanner unit 140 is a reading apparatus which reads an image on a document.

The printer unit 150 prints an image on a sheet based on input print data.

Figure 2:
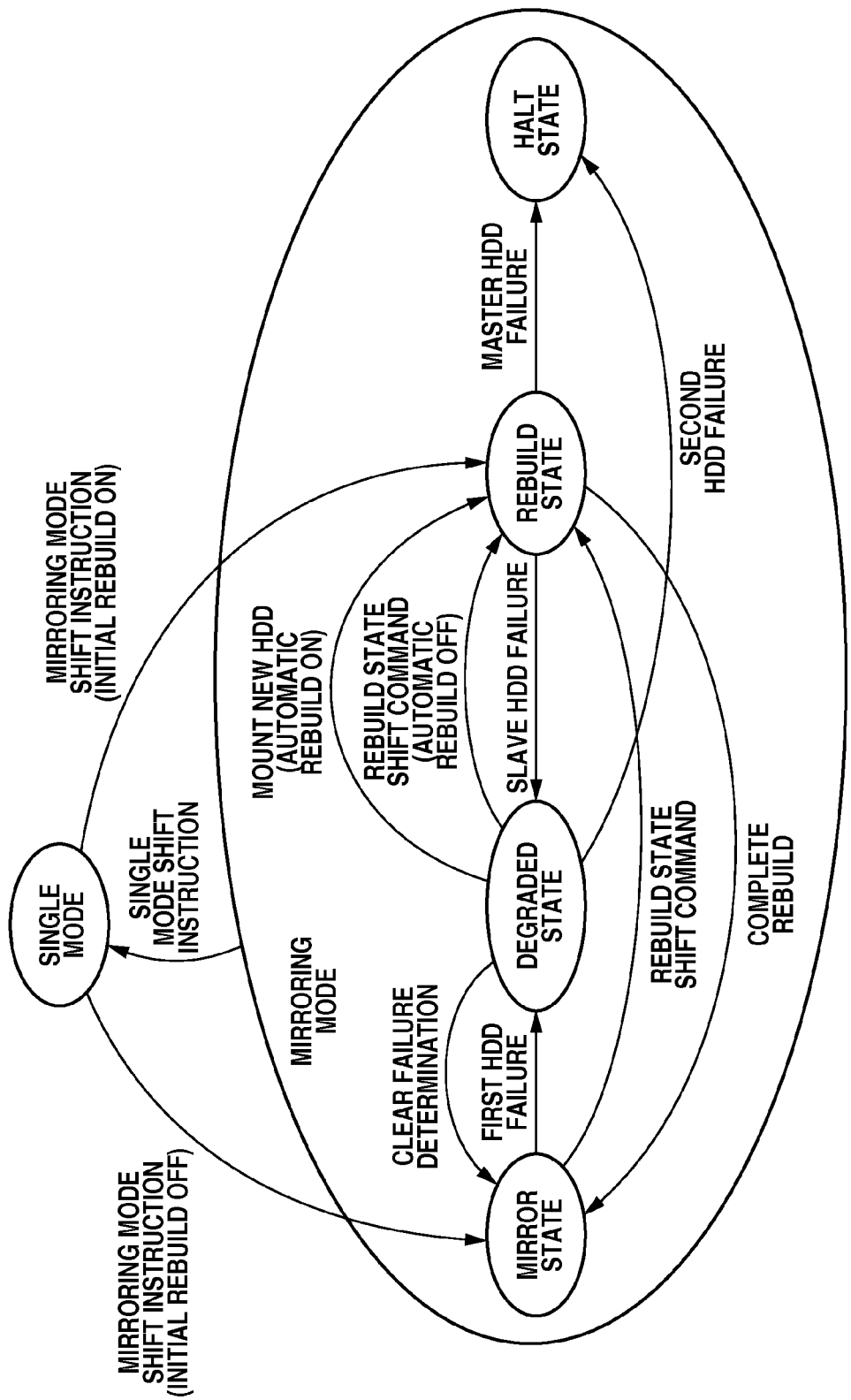
FIG. 2 illustrates state transitions in a disk array apparatus.

FIG. 2 illustrates state transitions in the disk array apparatus.

The disk array apparatus 120 has two operation modes, namely a single mode and a mirroring mode. In the single mode, the disk array apparatus 120 operates using only one hard disk drive. In the mirroring mode, the disk array apparatus 120 operates in a state in which two or more hard disk drives are mounted thereon. The mirroring mode includes four states, namely a mirror state, a degraded state, a rebuild state, and a halt state.

The mirror state is a state in which the master HDD 124 and the slave HDD 125 operate normally. In the mirror state, the mirroring control unit 121 reads data from the master HDD 124 in response to an instruction from the storage control unit 117. The mirroring control unit 121 also writes data to both of the master HDD 124 and the slave HDD 125 in response to an instruction from the storage control unit 117. The above-mentioned writing instruction may be an instruction to write to both of the master HDD 124 and the slave HDD 125, and the mirroring control unit 121 may write data to both of the HDDs 124 and 125 in response to the instruction. Further, the above-mentioned writing instruction may be an instruction to write to the master HDD 124, and the mirroring control unit 121 may independently write data written to the master HDD 124 to the slave HDD 125. If a failure occurs in either one of the HDDs (a first HDD) in the mirror state, the state is shifted to the degraded state. If the storage control unit 117 issues a command to shift to the rebuild state in the mirror state, the state is shifted to the rebuild state described below.

The degraded state is a state to be shifted thereto when it is determined that a failure occurs in either one of the master HDD 124 or the slave HDD 125. In the degraded state, the other HDD (the HDD not faulty) only operates. In the degraded state, if a new HDD is mounted instead of the HDD determined as faulty in a state in which an automatic rebuild function is ON, the disk array apparatus 120 is shifted to the rebuild state without a shift command described below. In the degraded state, if a new HDD is mounted instead of the HDD determined as faulty in a state in which the automatic rebuild function is OFF, the disk array apparatus 120 remains in the degraded state. In the degraded state, if a new HDD is mounted when the automatic rebuild function is OFF, and then the storage control unit 117 issues a command to shift to the rebuild state, the disk array apparatus 120 is shifted to the rebuild state. In the degraded state, if it is determined that a failure further occurs in the HDD which has not been in failure (a second HDD), the disk array apparatus 120 is shifted to the halt state. According to the present exemplary embodiment, if the HDD determined as faulty is then determined as not faulty in the degraded state, the disk array apparatus 120 is shifted to the mirror state.

In the rebuild state, data is copied (rebuilt) from one HDD (the HDD not faulty) to the other HDD (the HDD newly mounted instead of the faulty HDD). A copy source HDD (the HDD previously mounted and not faulty) becomes a master HDD, and a copy destination HDD (the HDD newly mounted instead of the faulty HDD) becomes the slave HDD 125. When the rebuilding is completed in the rebuild state, the disk array apparatus 120 is shifted to the mirror state. If a failure occurs in the slave HDD in the rebuild state, the disk array apparatus 120 is shifted to the degraded state. Further, if a failure occurs in the master HDD in the rebuild state, the disk array apparatus 120 is shifted to the halt state.

In the halt state, both of the HDDs are faulty, and mirroring cannot be continued.

In the single mode, if the storage control unit 117 issues a shift instruction to the mirroring mode to the mirroring control unit 121 in a state in which the automatic rebuild function is ON, the disk array apparatus 120 is shifted to the rebuild state. In the single mode, if the storage control unit 117 issues a shift instruction to the mirroring mode to the mirroring control unit 121 in a state in which the automatic rebuild function is OFF, the disk array apparatus 120 is shifted to the mirror state.

In the mirroring mode, if the mirroring control unit 121 receives a shift instruction to the single mode from the storage control unit 117, the disk array apparatus 120 is shifted to the single mode in any state.

Figure 3:
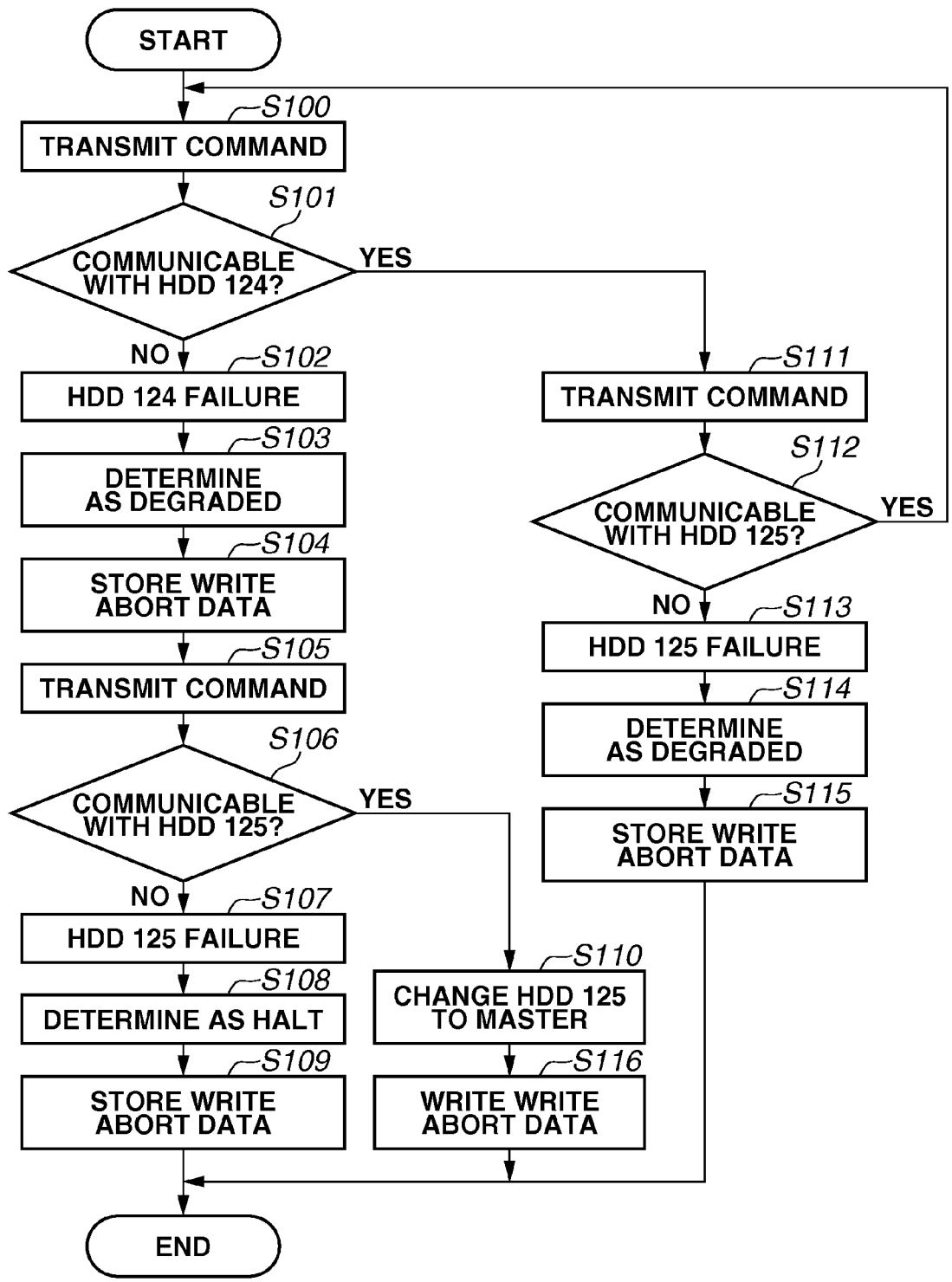
FIG. 3 is a flowchart illustrating failure determination processing of the disk array apparatus.

FIG. 3 is a flowchart illustrating failure determination processing regarding the master HDD 124 and the slave HDD 125 of the disk array apparatus 120. The failure determination processing may be executed at a predetermined timing during the disk array apparatus 120 is executing mirroring processing or may be executed when the shutdown processing is executed in the MFP 100. The disk array apparatus 120 according to the present exemplary embodiment determines that a failure occurs in the master HDD 124 when data communication between the mirroring control unit 121 and the master HDD 124 is lost. In addition, when data communication between the mirroring control unit 121 and the slave HDD 125 is lost, the disk array apparatus 120 determines that a failure occurs in the slave HDD 125. Causes of the data communication loss between the mirroring control unit 121 and the HDD 124 or the HDD 125 may include a failure in the HDD 124 or the HDD 125, and removal of the HDD 124 or the HDD 125.

When the MFP 100 operates, data accesses (writing and reading) occur frequently to the master HDD 124 and the slave HDD 125. For example, when print data is received from an external apparatus, which is not illustrated, via the network I/F 114, the mirroring control unit 121 temporarily stores the print data in the HDD 124. The print data written in the master HDD 124 is subjected to image processing by the CPU 111 (or an application specific integrated circuit (ASIC) performing image processing, not illustrated). The image processed data is stored in the master HDD 124. The mirroring control unit 121 of the disk array apparatus 120 performs mirroring between the master HDD 124 and the slave HDD 125.

In addition, the mirroring control unit 121 periodically performs data communication with the HDD 124 and the HDD 125 to monitor whether a failure occurs in the HDD 124 and the HDD 125. Since the disk array apparatus 120 includes two hard disk drives, namely the master HDD 124 and the slave HDD 125 according to the present exemplary embodiment, determination of whether a failure occurs in the hard disk drive is alternately performed on one another.

As illustrated in FIG. 3, in step S100, the mirroring control unit 121 transmits a command (read, write, or another command) to the master HDD 124. In step S101, the mirroring control unit 121 determines whether to be communicable with the master HDD 124 based on whether a response to the transmitted command is received within a predetermined time period from the master HDD 124.

If the response from the master HDD 124 is not received within the predetermined time period (NO in step S101), then in step S102, the mirroring control unit 121 determines that a failure occurs in the master HDD 124. In step S103, the mirroring control unit 121 determines that the disk array apparatus 120 is in the degraded state. The mirroring control unit 121 instructs the storage control unit 117 to store information indicating the failure of the master HDD 124 and a serial number of the master HDD 124 in the SRAM 116. The mirroring control unit 121 further instructs the storage control unit 117 to store information indicating a state of the disk array apparatus 120 (information indicating the degraded state in this case) in the SRAM 116. In step S104, the mirroring control unit 121 stores data which cannot be written to the master HDD 124 (i.e., "write abort data") to the data storage unit 122.

Next, in step S105, the mirroring control unit 121 transmits a command (read, write, or another command) to the slave HDD 125. In step S106, the mirroring control unit 121 determines whether to be communicable with the slave HDD 125 based on whether a response to the transmitted command is received within a predetermined time period from the slave HDD 125. If the response from the slave HDD 125 is not received within the predetermined time period (NO in step S106), then in step S107, the mirroring control unit 121 determines that a failure occurs in the slave HDD 125. In step S108, the mirroring control unit 121 determines that the disk array apparatus 120 is in the halt state. The mirroring control unit 121 instructs the storage control unit 117 to store information indicating the failure of the slave HDD 125 and a serial number of the slave HDD 125 in the SRAM 116. The mirroring control unit 121 further instructs the storage control unit 117 to store information indicating the state of the disk array apparatus 120 (information indicating the halt state in this case) in the SRAM 116. In step S109, the mirroring control unit 121 stores data which cannot be written to the slave HDD 125 (i.e., "write abort data") to the data storage unit 122. The mirroring control unit 121 may instruct the storage control unit 117 to store the above-described serial numbers to the SRAM 116 when the HDDs are connected thereto. When a failure occurs in any of the master HDD 124 and the slave HDD 125, the mirroring control unit 121 may instruct the storage control unit 117 to store information indicating the failure in association with the preliminarily stored serial number.

In step S106, if the mirroring control unit 121 is communicable with the slave HDD 125 (YES in step S106), in step S110, the mirroring control unit 121 changes the slave HDD 125 to the master HDD. In this case, the MFP 100 performs various processing such as image processing using the HDD 125 changed to the master HDD. In step S116, the mirroring control unit 121 writes the write abort data stored in step S104 to the HDD 125 changed to the master HDD. In this case, the disk array apparatus 120 is in the degraded state.

In step S101, if the mirroring control unit 121 is communicable with the master HDD 124 (YES in step S101), the mirroring control unit 121 performs processing similar to that in the above-described steps S105 to S108. More specifically, in step S111, the mirroring control unit 121 transmits a command (read, write, or another command) to the slave HDD 125. In step S112, the mirroring control unit 121 determines whether to be communicable with the slave HDD 125 based on whether a response to the transmitted command is received within a predetermined time period from the slave HDD 125. If the mirroring control unit 121 is not communicable with the slave HDD 125 (NO in step S112), then in step S113, the mirroring control unit 121 determines that a failure occurs in the slave HDD 125. In step S114, the mirroring control unit 121 determines that the disk array apparatus 120 is in the degraded state. The mirroring control unit 121 instructs the storage control unit 117 to store the information indicating the failure of the slave HDD 125 and the serial number of the slave HDD 125 in the SRAM 116. The mirroring control unit 121 further instructs the storage control unit 117 to store the information indicating the state of the disk array apparatus 120 (information indicating the degraded state in this case) in the SRAM 116. In step S115, the mirroring control unit 121 stores the data which cannot be written to the slave HDD 125 (i.e., "write abort data") to the data storage unit 122.

Figure 4:
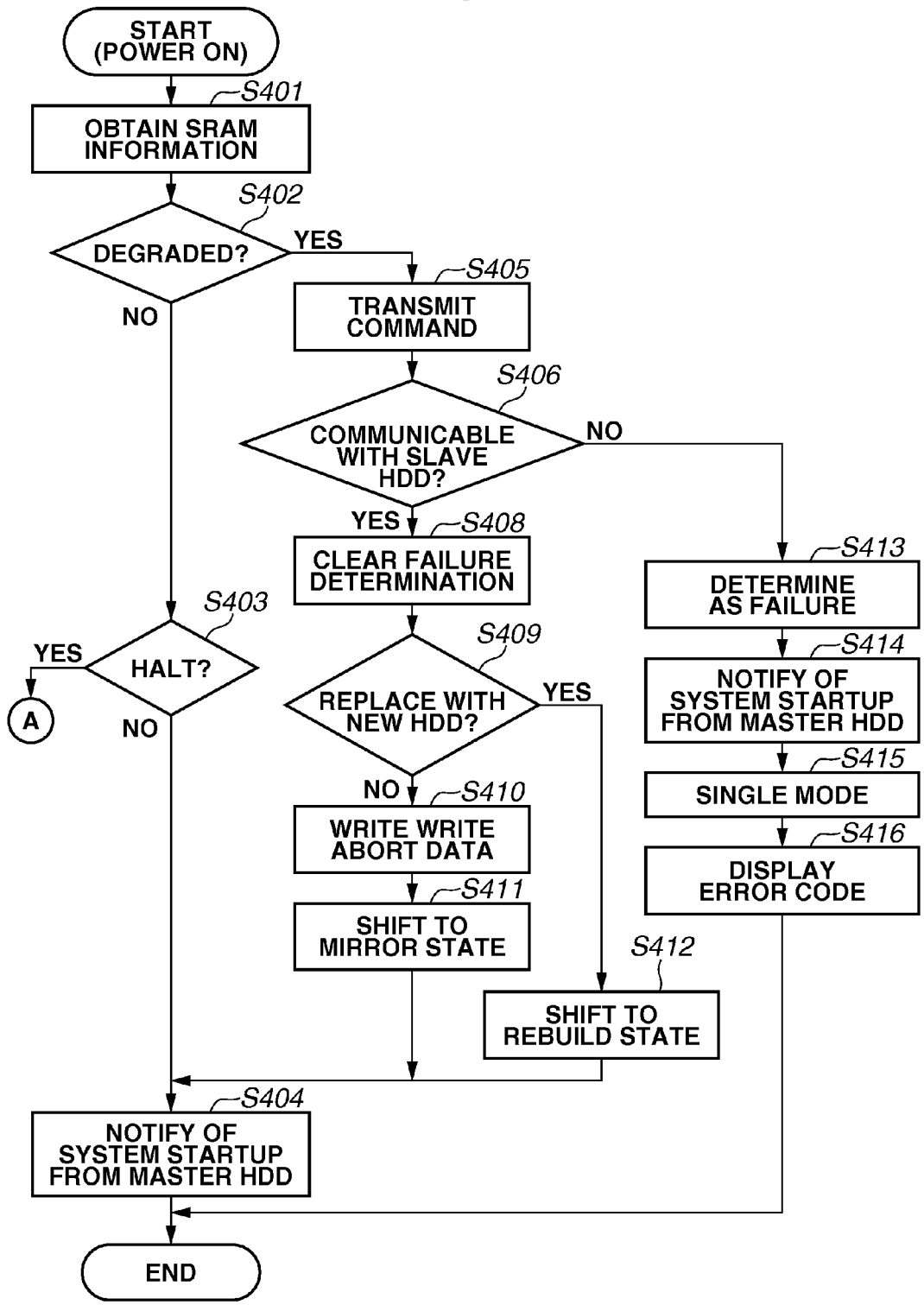
Figure 5:
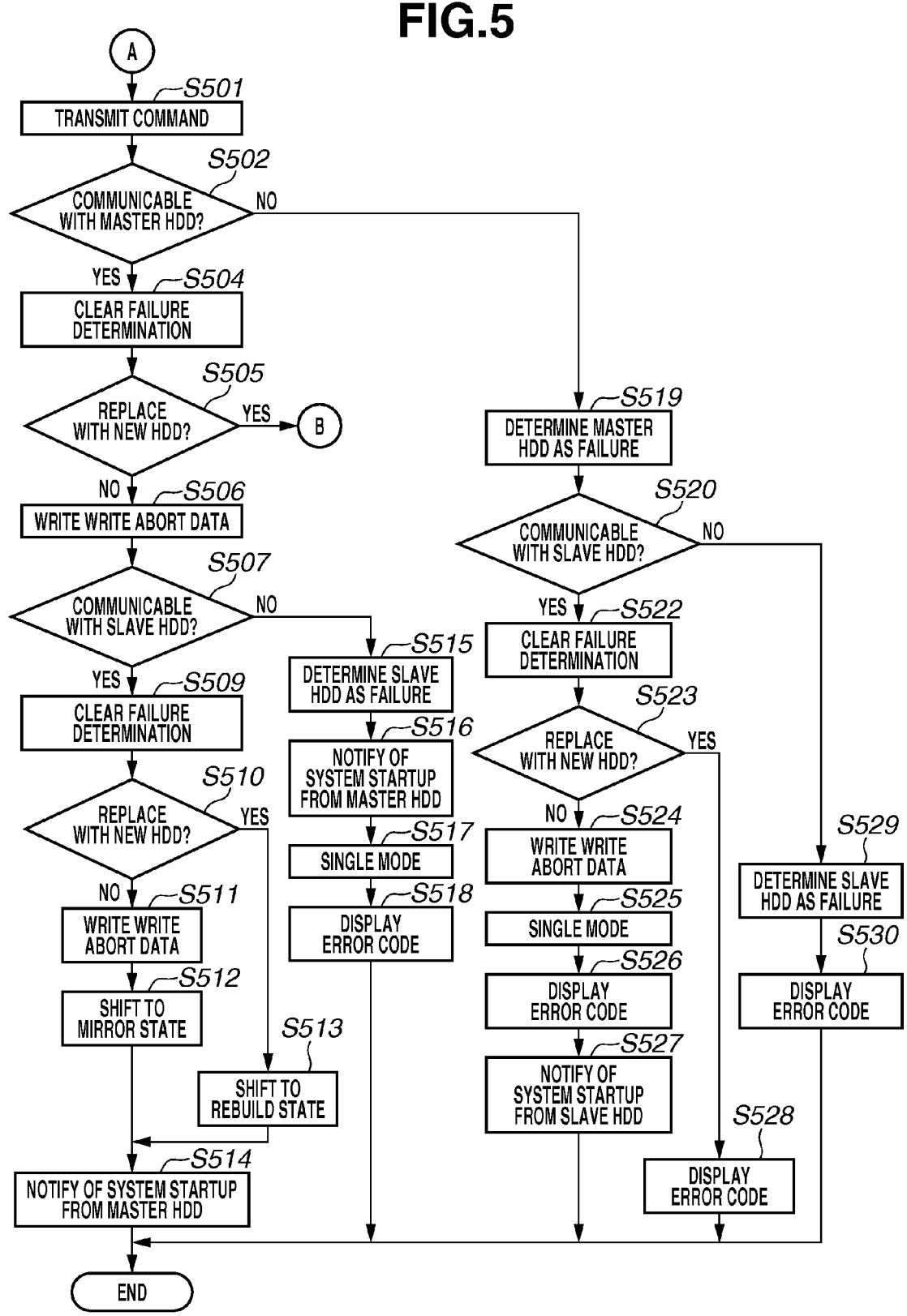
Figure 6:
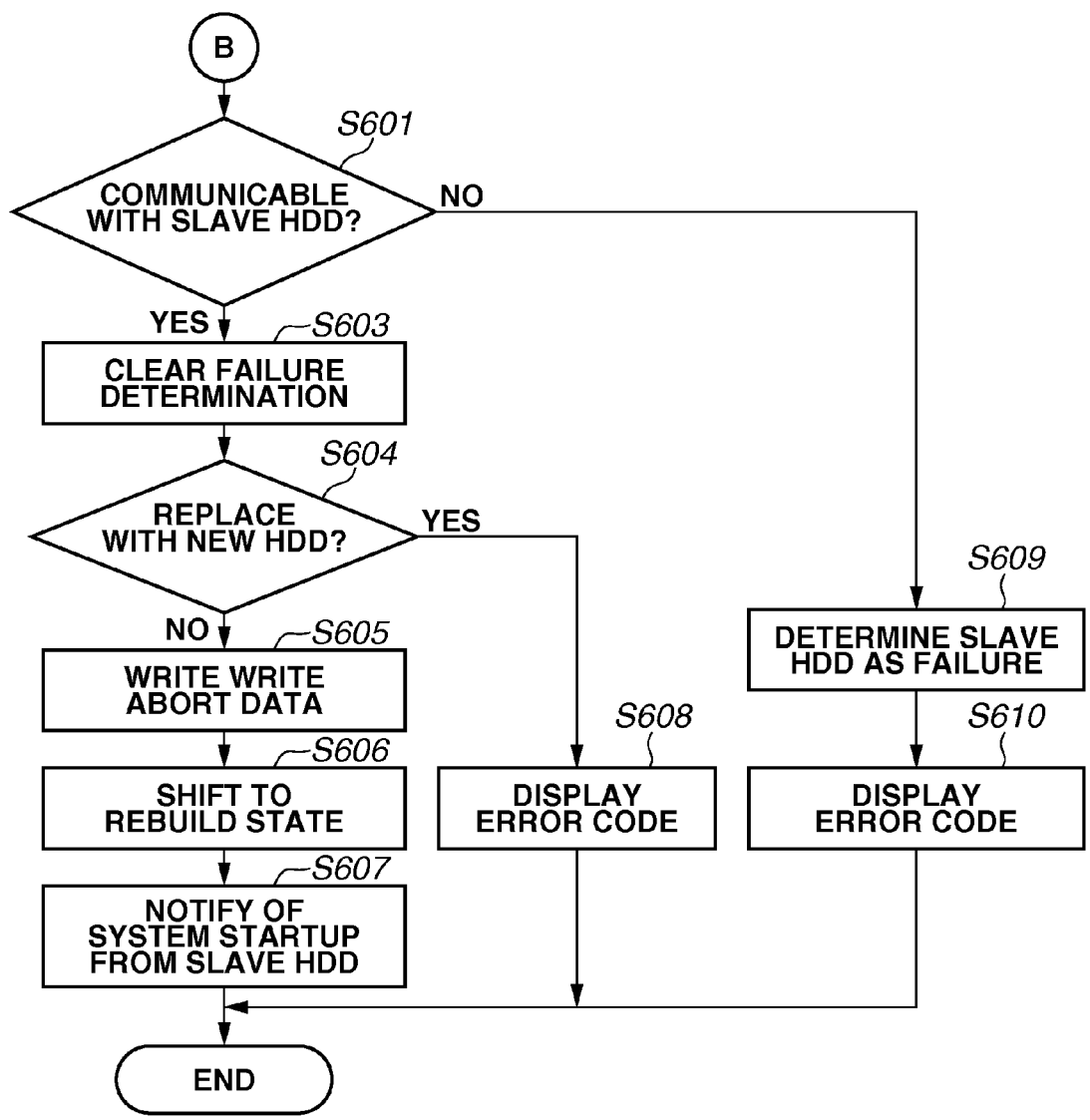

FIGS. 4, 5, and 6 are flowcharts illustrating control executed by the mirroring control unit 121 when the MFP 100 is powered ON. First, the processing executed when the disk array apparatus 120 is in the degraded state is described with reference to FIG. 4.

When the MFP 100 is powered on, the CPU 111 of the controller 110 initializes each constitutional unit in the MFP 100 according to programs stored in the ROM 112.

In step S401, the mirroring control unit 121 obtains storage information and state information of the HDD 124 and the HDD 125 stored in the SRAM 116 via the storage control unit 117.

As illustrated in FIGS. 7A and 7B, the storage information stored in the SRAM 116 includes a serial number of the HDD connected to the master HDD and information (failure determination result) indicating whether the HDD having the relevant serial number is determined as faulty. Further, the state information stored in the SRAM 116 includes information indicating the state of the disk array apparatus 120. The example in FIG. 7A shows that the master HDD 124 has a serial number "1111111111" and can operate normally. The example in FIG. 7A also shows that the slave HDD 125 has the serial number "2222222222" and is determined as faulty. In addition, the example in FIG. 7B shows that the disk array apparatus 120 is in the degraded state. The mirroring control unit 121 does not write data to the HDD determined as faulty (the HDD of which failure determination result is "1").

Returning to FIG. 4, in step S402, the mirroring control unit 121 determines whether the disk array apparatus 120 is in the degraded state or in the halt state based on the above-described state information stored in the SRAM 116. The case where the disk array apparatus 120 is in the halt state (YES in step S403) is described below.

The storage information and the state information stored in the SRAM 116 may be stored in a memory other than the SRAM 116 as long as the memory is a nonvolatile memory. For example, the data storage unit 122 of the disk array apparatus 120 may store the above-described storage information and state information therein.

If the disk array apparatus 120 is in the rebuild state, the mirror state, or the single mode, in step S404, the mirroring control unit 121 notifies the controller 110 that the system can be started up using the data stored in the master HDD 124. Accordingly, the CPU 111 of the controller 110 starts up the system using the data in the master HDD 124.

If the disk array apparatus 120 is in the degraded state (YES in step S402), then in step S405, the mirroring control unit 121 transmits a command (read, write, or another command) to the slave HDD 125. Here, a case is described in which the slave HDD 125 is determined as faulty in step S113, and the state is shifted to the degraded state in step S114 in FIG. 3. If the HDD 124 is determined as faulty in step S102 and the state is shifted to the degraded state in step S103 in FIG. 3, there may be a case that the HDD 125 becomes the master HDD in step S110, however, the descriptions of that case is omitted here.

In step S406, the mirroring control unit 121 determines whether to be communicable with the slave HDD 125 based on whether a response to the transmitted command is received within a predetermined time period from the slave HDD 125. If the mirroring control unit 121 determines to be communicable with the slave HDD 125 (YES in step S406), then in step S408, the mirroring control unit 121 instructs the storage control unit 117 to clear the failure determination of the slave HDD 125. More specifically, the storage control unit 117 received the instruction instructs the CPU 111 to clear the failure determination result of the slave HDD 125 (changes to "0") stored in the SRAM 116. Accordingly, if the slave HDD 125 which is determined as faulty in the flowchart in FIG. 3 is not actually faulty, the failure determination result of the relevant slave HDD 125 can be cleared. Thus, the slave HDD 125 which is once determined as faulty can be used again.

If the slave HDD 125 is removed from the disk array apparatus 120 during its operation, the mirroring control unit 121 cannot communicate with the slave HDD 125, thus the slave HDD 125 is determined as faulty (in steps S112 and S113). Thus, according to the present exemplary embodiment, when the MFP 100 is powered ON, a command is transmitted to the slave HDD 125 to check again whether the mirroring control unit 121 is communicable with the slave HDD 125 (in steps S405 and S406). Accordingly, if the mirroring control unit 121 is communicable with the slave HDD 125 determined as faulty, it means that the slave HDD 125 is not actually faulty, and the slave HDD 125 can be used again.

Then, the mirroring control unit 121 obtains the serial number of the HDD connected to the slave HDD and compares the obtained serial number with the serial number of the HDD which has been connected before the power is turned off. Accordingly, in step S409, the mirroring control unit 121 determines whether the HDD connected to the slave HDD is replaced with a new HDD or the HDD connected to the slave HDD is connected again. More specifically, if it is determined that the serial number obtained from the HDD connected to the slave HDD is different from the serial number obtained from the SRAM 116, the mirroring control unit 121 determines that the HDD is replaced with a new HDD. Further, if it is determined that the serial number obtained from the HDD connected to the slave HDD coincides with the serial number obtained from the SRAM 116, the mirroring control unit 121 determines that the HDD connected to the slave HDD is connected again. Then, in step S410, the mirroring control unit 121 writes the write abort data stored in the data storage unit 122 to the slave HDD 125.

When the HDD connected to the slave HDD is connected again (NO in step S409), in step S411, the disk array apparatus 120 is shifted to the mirror state. Whereas, when the HDD connected to the slave HDD is replaced with a new HDD (YES in step S409), in step S412, the disk array apparatus 120 is shifted to the rebuild state. In the mirror state and the rebuild state, storing and reading data in and from the slave HDD 125 is permitted.

If a response to the transmitted command is not received within a predetermined time period from the slave HDD 125 (NO in step S406), in step S413, the mirroring control unit 121 determines that a failure occurs in the slave HDD 125. In step S414, the mirroring control unit 121 notifies the controller 110 that the system can be started up using the data stored in the master HDD 124. Accordingly, the CPU 111 of the controller 110 starts up the system using the data in the master HDD 124. Then, in step S416, the mirroring control unit 121 instructs the display unit 130 to display a screen 900 (see FIG. 8) indicating abnormality of the hard disk. The screen displays an error code for a service person to specify an error type and a message indicating the abnormality of the hard disk.

Next, the processing executed when the disk array apparatus 120 is in the halt state is described with reference to FIG. 5.

When the disk array apparatus 120 is in the halt state (YES in step S403), then in step S501, the mirroring control unit 121 transmits a command (read, write, or another command) to the master HDD 124 and the HDD 125.

In step S502, the mirroring control unit 121 determines whether to be communicable with the master HDD 124 based on whether a response to the transmitted command is received within a predetermined time period from the master HDD 124. If the mirroring control unit 121 determines to be communicable with the master HDD 124 (YES in step S502), in step S504, the mirroring control unit 121 instructs the CPU 111 to clear the failure determination of the master HDD 124 stored in the SRAM 116. According to the instruction, the CPU 111 clears the failure determination of the master HDD 124 stored in the SRAM 116.

The mirroring control unit 121 obtains the serial number of the HDD connected to the master HDD and compares the obtained serial number with the serial number obtained from the SRAM 116. In step S505, the mirroring control unit 121 determines whether the HDD connected to the master HDD is replaced with a new HDD or the HDD same as the one connected to the master HDD is connected again by comparing the serial numbers. More specifically, if it is determined that the serial number obtained from the HDD connected to the master HDD is different from the serial number obtained from the SRAM 116, the mirroring control unit 121 determines that the HDD is replaced with a new HDD. Further, if it is determined that the serial number obtained from the HDD connected to the master HDD coincides with the serial number obtained from the SRAM 116, the mirroring control unit 121 determines that the HDD same as the one connected to the master HDD is connected again. Then, in step S506, the mirroring control unit 121 issues an instruction to write the write abort data stored in the data storage unit 122 to the master HDD 124.

A case when the HDD connected to the master HDD is replaced with a new HDD is described below with reference to FIG. 6.

Next, if the HDD same as the one connected to the master HDD is connected again (NO in step S505), in step S507, the mirroring control unit 121 determines whether to be communicable with the slave HDD 125. More specifically, in step S507, the mirroring control unit 121 determines whether to be communicable with the slave HDD 125 based on whether a response to the command transmitted in step S501 is received within a predetermined time period from the slave HDD 125. If the mirroring control unit 121 determines to be communicable with the slave HDD 125 (YES in step S507), in step S509, the mirroring control unit 121 clears the failure determination stored in the SRAM 116.

Then, the mirroring control unit 121 obtains the serial number of the HDD connected to the slave HDD and compares the obtained serial number with the serial number obtained from the SRAM 116. In step S510, the mirroring control unit 121 determines whether the HDD connected to the slave HDD is replaced with a new HDD or the HDD same as the one connected to the slave HDD is connected again by comparing the serial numbers. More specifically, if it is determined that the serial number obtained from the HDD connected to the slave HDD is different from the serial number obtained from the SRAM 116, the mirroring control unit 121 determines that the HDD is replaced with a new HDD. Further, if it is determined that the serial number obtained from the HDD connected to the slave HDD coincides with the serial number obtained from the SRAM 116, the mirroring control unit 121 determines that the HDD same as the one connected to the slave HDD is connected again. Then, in step S511, the mirroring control unit 121 issues an instruction to write the write abort data stored in the data storage unit 122 to the slave HDD 125.

If the HDD same as the one connected to the slave HDD is connected again (NO in step S510), in step S512, the disk array apparatus 120 is shifted to the mirror state. Whereas if a new HDD is connected (YES in step S510), in step S513, the disk array apparatus 120 is shifted to the rebuild state. In the mirror state and the rebuild state, storing and reading data in and from the slave HDD 125 is permitted.

In step S514, the mirroring control unit 121 notifies the controller 110 that the system can be started up using the data stored in the master HDD 124. Accordingly, the CPU 111 of the controller 110 starts up the system using the data in the master HDD 124.

In step S507, if the mirroring control unit 121 is not communicable with the slave HDD 125 (NO in step S507), then in step S515, the mirroring control unit 121 determines that a failure occurs in the slave HDD 125. In step S516, the mirroring control unit 121 notifies the controller 110 that the system can be started up using the data stored in the master HDD 124. In step S517, the disk array apparatus 120 is shifted to the single mode. Then, in step S518, the mirroring control unit 121 instructs the display unit 130 to display the above-described screen 900 (see FIG. 8).

Next, in step S502, if the mirroring control unit 121 does not receive the response from the master HDD 124 within the predetermined time period (NO in step S502), in step S519, the mirroring control unit 121 determines that a failure occurs in the master HDD 124.

Next, in step S520, the mirroring control unit 121 determines whether to be communicable with the slave HDD 125 based on whether a response to the command transmitted in step S501 is received within a predetermined time period from the slave HDD 125. If the mirroring control unit 121 determines to be communicable with the slave HDD 125 (YES in step S520), then in step S523, the mirroring control unit 121 clears the failure determination stored in the SRAM 116.

The mirroring control unit 121 obtains the serial number of the HDD connected to the slave HDD and compares the obtained serial number with the serial number obtained from the SRAM 116. In step S523, the mirroring control unit 121 determines whether the HDD connected to the slave HDD is replaced with a new HDD or the HDD same as the one connected to the slave HDD is connected again by comparing the serial numbers. More specifically, if it is determined that the serial number obtained from the HDD connected to the slave HDD is different from the serial number obtained from the SRAM 116, the mirroring control unit 121 determines that the HDD is replaced with a new HDD. Further, if it is determined that the serial number obtained from the HDD connected to the slave HDD coincides with the serial number obtained from the SRAM 116, the mirroring control unit 121 determines that the HDD same as the one connected to the slave HDD is connected again. Then, in step S524, the mirroring control unit 121 issues an instruction to write the write abort data stored in the data storage unit 122 to the slave HDD 125.

If the HDD same as the one connected to the slave HDD is connected again (NO in step S523), in step S525, the disk array apparatus 120 is shifted to the single mode. Then, in step S526, the mirroring control unit 121 instructs the display unit 130 to display the above-described screen 900

Figure 8:
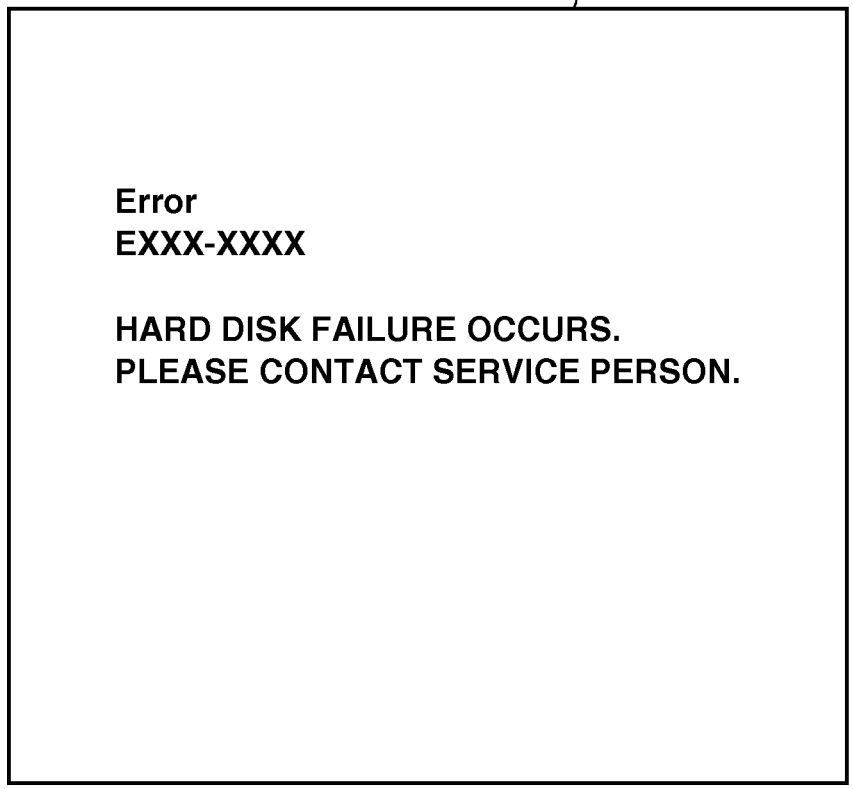
FIG. 8 illustrates a screen displayed on a display unit.

(see FIG. 8). In step S527, the mirroring control unit 121 notifies the controller 110 that the system can be started up using the data stored in the slave HDD 125. Accordingly, the CPU 111 of the controller 110 starts up the system using the data in the slave HDD 125.

Whereas, in step S523, if it is determined that a new HDD is connected (YES in step S523), a failure occurs in the master HDD 124 and the slave HDD 125 is a blank HDD in the disk array apparatus 120, so that the system cannot be started up. Thus, in step S528, the mirroring control unit 121 instructs the display unit 130 to display the above-described screen 900 (see FIG. 8).

In step S520, if the mirroring control unit 121 is not communicable with the slave HDD 125 (NO in step S520), in step S529, the mirroring control unit 121 determines that a failure occurs in the slave HDD 125. In this case, failures occur in both of the master HDD 124 and the slave HDD 125, so that the system cannot be started up. Thus, in step S530, the mirroring control unit 121 instructs the display unit 130 to display the above-described screen 900 (see FIG. 8).

Next, a case when the HDD connected to the master HDD is replaced with a new HDD in step S505 in FIG. 5 is described with reference to FIG. 6.

If a new HDD is connected to the master HDD (YES in step S505), then in step S601, the mirroring control unit 121 determines whether to be communicable with the slave HDD 125. More specifically, in step S601, the mirroring control unit 121 determines whether to be communicable with the slave HDD 125 based on whether a response to the command transmitted in step S501 is received within a predetermined time period from the slave HDD 125. If the mirroring control unit 121 determines to be communicable with the slave HDD 125 (YES in step S601), in step S603, the mirroring control unit 121 clears the failure determination stored in the SRAM 116.

Then, the mirroring control unit 121 obtains the serial number of the HDD connected to the slave HDD and compares the obtained serial number with the serial number obtained from the SRAM 116. In step S604, the mirroring control unit 121 determines whether the HDD connected to the slave HDD is replaced with a new HDD or the HDD same as the one connected to the slave HDD is connected again by comparing the serial numbers. More specifically, if it is determined that the serial number obtained from the HDD connected to the slave HDD is different from the serial number obtained from the SRAM 116, the mirroring control unit 121 determines that the HDD is replaced with a new HDD. Further, if it is determined that the serial number obtained from the HDD connected to the slave HDD coincides with the serial number obtained from the SRAM 116, the mirroring control unit 121 determines that the HDD same as the one connected to the slave HDD is connected again. Then, in step S605, the mirroring control unit 121 issues an instruction to write the write abort data stored in the data storage unit 122 to the slave HDD 125.

If the HDD same as the one connected to the slave HDD is connected again (NO in step S604), in step S608, the disk array apparatus 120 is shifted to the rebuild state. In this case, the HDD connected to the slave HDD becomes the master HDD, and rebuild processing is executed in which data stored in the master HDD is stored in the HDD to be connected to the slave HDD. In step S607, the mirroring control unit 121 notifies the controller 110 that the system can be started up using the data stored in the slave HDD 125 (which newly becomes the master HDD). Accordingly, the CPU 111 of the controller 110 starts up the system using the data in the slave HDD 125 (which newly becomes the master HDD).

Whereas, in step S604, if a new HDD is connected to the slave HDD (YES in step S604), both of the master HDD 124 and the slave HDD 125 are replaced with new HDDs, so that the system cannot be started up. Thus, in step S608, the mirroring control unit 121 instructs the display unit 130 to display the above-described screen 900 (see FIG. 8).

In step S601, if the mirroring control unit 121 does not receive the response from the slave HDD 125 within the predetermined time period (NO in step S601), then in step S609, the mirroring control unit 121 determines that a failure occurs in the slave HDD 125. In this case, the master HDD 124 is replaced with a new HDD, and a failure occurs in the slave HDD 125, so that the system cannot be started up. Thus, in step S610, the mirroring control unit 121 instructs the display unit 130 to display the above-described screen 900 (see FIG. 8).

According to the first exemplary embodiment, a case in which the HDD is removed in the mirror state is described. According to a second exemplary embodiment, a case in which the HDD is removed in the rebuild state is described. Descriptions of processing similar to that in the first exemplary embodiment are omitted.

Figure 9:
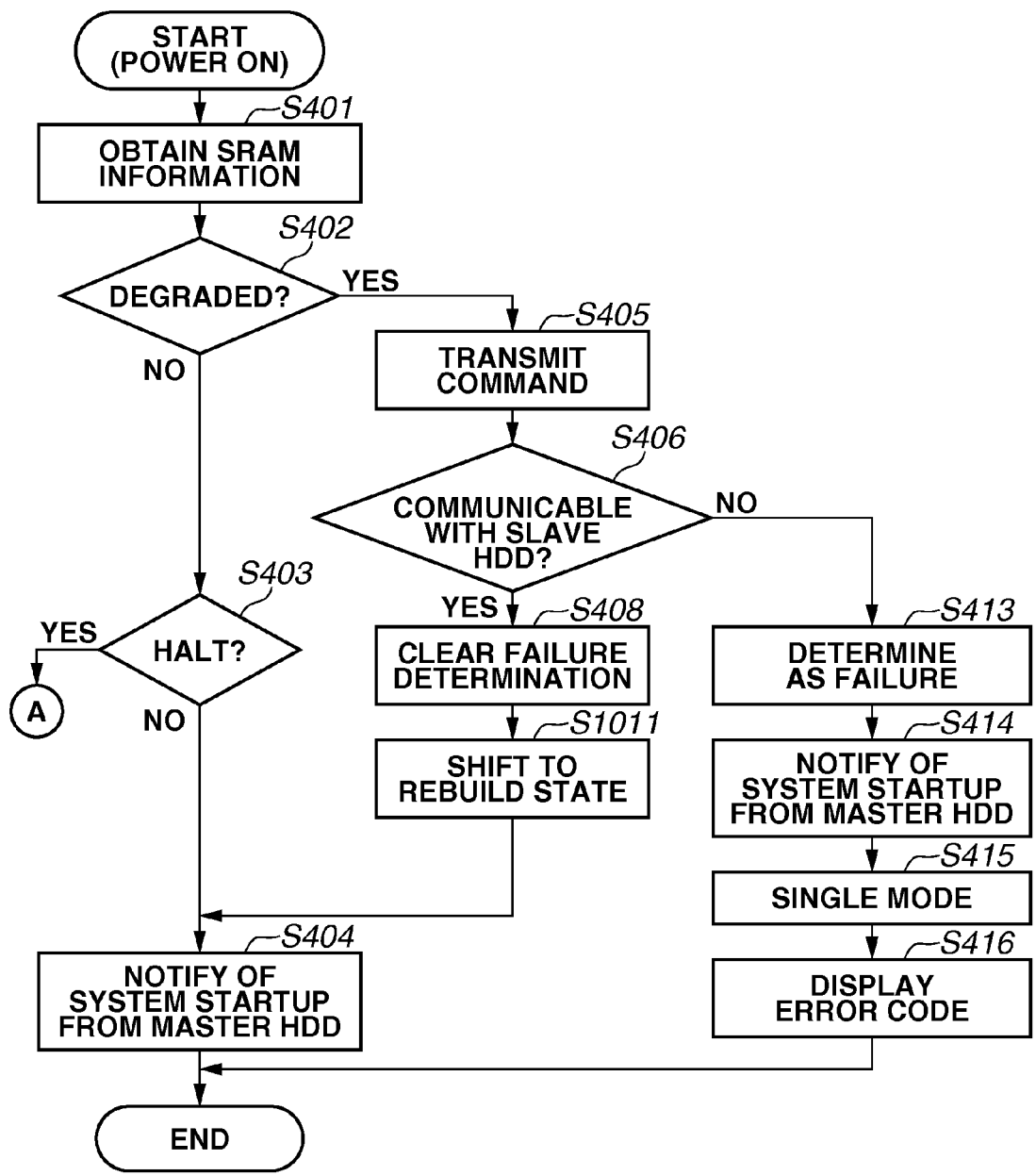
FIG. 9 is a flowchart illustrating processing executed by an MFP according to a second exemplary embodiment.

As illustrated in FIG. 9, if the disk array apparatus 120 is shifted from the rebuild state to the degraded state (YES in step S402), in step S406, the mirroring control unit 121 checks whether to be communicable with the slave HDD 125. If the mirroring control unit 121 determines to be communicable with the slave HDD 125 (YES in step S406), in step S1011, the mirroring control unit 121 instructs the disk array apparatus 120 to shift to the rebuild state. The mirroring control unit 121 is communicable with the slave HDD 125 in the case where the slave HDD 125 is connected again and in the case where a new HDD is connected to the slave HDD.

In the case where a new HDD is connected to the slave HDD, the rebuild processing is executed to copy the data stored in the master HDD 124 to the new HDD.

Whereas, in the case where the slave HDD 125 is connected to the slave HDD again, the rebuild processing interrupted by the shutdown processing is restarted.

Figure 10:
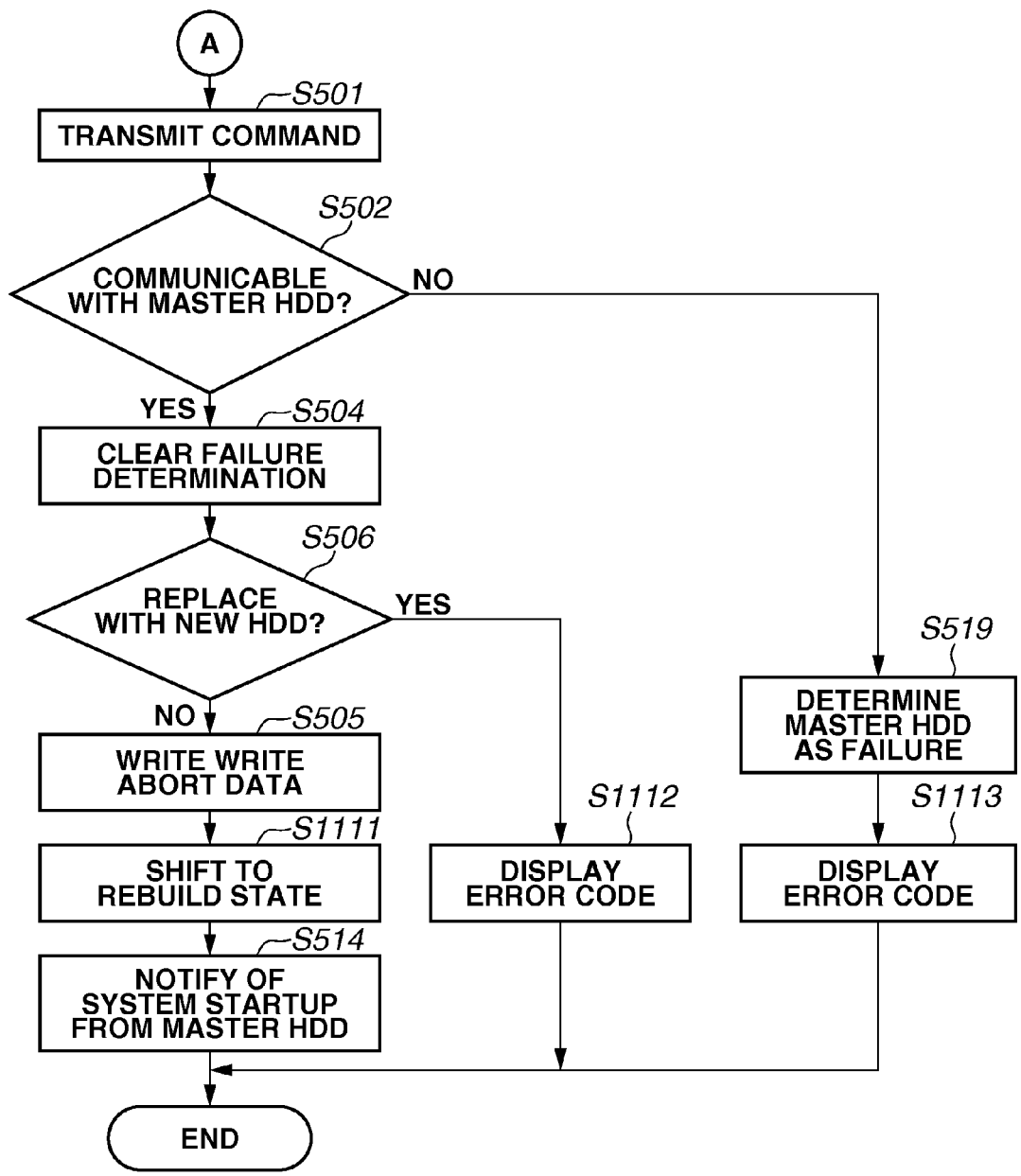
FIG. 10 is a flowchart illustrating processing executed by the MFP according to the second exemplary embodiment.

As illustrated in FIG. 10, in the case where the disk array apparatus 120 is shifted to the halt state, when the HDD same as the HDD connected to the master HDD is connected again, in step S1111, the mirroring control unit 121 instructs the disk array apparatus 120 to shift to the rebuild state.

Whereas, if a new HDD is connected to the master HDD (NO in step S506), in step S1112, the mirroring control unit 121 instructs the display unit 130 to display the screen 900 (see FIG. 8). Further, if the mirroring control unit 121 is not communicable with the master HDD 124 (NO in step S502), in step S1113, the mirroring control unit 121 also instructs the display unit 130 to display the screen 900 (see FIG. 8).

According to the above-described exemplary embodiments, the hard disk drive is exemplified as the storage device, however, the storage device is not limited to being a hard disk drive. An SSD and a flash memory may be used instead of the hard disk drive.

Further, according to the above-described exemplary embodiments, the disk array apparatus including a plurality of hard disk drives is described. However, the above-described exemplary embodiments can be applied to the apparatus from which one of the hard disk drive is removed.

Furthermore, according to the above-described exemplary embodiments, the image forming apparatus including the printer unit is described. However, the above-described exemplary embodiments can be applied to an information processing apparatus, such as a PC.

Other Embodiments

Additional embodiments can also be realized by a computer of a system or apparatus that reads out and executes computer executable instructions recorded on a storage medium (e.g., non-transitory computer-readable storage medium) to perform the functions of one or more of the above-described embodiments, and by a method performed by the computer of the system or apparatus by, for example, reading out and executing the computer executable instructions from the storage medium to perform the functions of one or more of the above-described embodiments. The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that these exemplary embodiments are not seen to be limiting. The scope of the following claims is to be accorded the broadest interpretation so as to encompass all such modifications and equivalent structures and functions.

This application claims the benefit of Japanese Patent Application No. 2014-091811, filed Apr. 25, 2014, which is hereby incorporated by reference herein in its entirety.

What is claimed is:

1. An information processing apparatus comprising:
a storage device; and
a control unit configured to determine whether communication between the control unit and the storage device is possible and prohibit data from being written to the storage device
if the communication between the control unit and the storage device is determined not to be possible,
wherein the communication between the control unit and the storage device is possible if the control unit receives a response to a transmitted command from the storage device within a predetermined time period,
wherein, at start-up, the control unit determines whether communication is possible with the storage device with which the control unit previously determines the communication is not possible, and
wherein the control unit permits data to be written to the storage device if communication with the storage device at the start-up is determined to be possible.

2. The information processing apparatus according claim 1, wherein the control unit, after the data stored in the memory unit is written to the storage device, notifies a system controller of a system start-up using the data in the storage device.

3. The information processing apparatus according claim 1, wherein data writing to the storage device includes mirroring that synchronizes data in another storage device.

4. The information processing apparatus according claim 1, further comprising a display unit configured to, if the control unit determines communication is not possible with the storage device at the start-up, display a screen indicating that a failure occurred in the storage device.

5. The information processing apparatus according claim 1,
wherein if the control unit determines communication is not possible with the storage device, the storage device stores a failure determination result indicating that the storage device is a faulty storage device,
wherein, when the control unit, in addition to determining whether communication is possible with the storage device at the start-up, clears the failure determination result stored in the storage unit if communication with the storage device is determined to be possible.

6. The information processing apparatus according claim 5, wherein, when the information processing apparatus is started up, if the failure determination result is stored in the storage unit, the control unit determines whether to communicate with the storage device with which the control unit previously determined the communication was not possible, and if the failure determination result is not stored in the storage unit, the control unit does not determine whether to communicate with the storage device with which the control unit previously determines the communication is not possible.

7. The information processing apparatus according claim 1, wherein the storage device is a hard disk drive.

8. The information processing apparatus according claim 1, further comprising at least a print unit configured to perform printing or a reading unit configured to read a document.

9. A method comprising:
determining whether communication between a control unit and a storage device is possible;
prohibiting data from being written to the storage device if the communication between the control unit and the storage device is determined not to be possible;
determining, at start-up, whether the communication is possible between the control unit and the storage device with which the communication is previously determined not possible; and
permitting data to be written to the storage device if the communication between the control unit and the storage device is determined to be possible at the start up,
wherein the communication between the control unit and the storage device is possible if the control unit receives a response to a transmitted command from the storage device within a predetermined time period.

* * * * *